(12) United States Patent
Toda et al.

(10) Patent No.: US 12,157,513 B2
(45) Date of Patent: Dec. 3, 2024

(54) FRAME MEMBER AND VEHICLE BODY STRUCTURE

(71) Applicant: NIPPON STEEL CORPORATION, Tokyo (JP)

(72) Inventors: Yuri Toda, Tokyo (JP); Hiroaki Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 572 days.

(21) Appl. No.: 17/437,365

(22) PCT Filed: Mar. 27, 2020

(86) PCT No.: PCT/JP2020/014050
§ 371 (c)(1),
(2) Date: Sep. 8, 2021

(87) PCT Pub. No.: WO2020/196837
PCT Pub. Date: Oct. 1, 2020

(65) Prior Publication Data
US 2022/0161857 A1 May 26, 2022

(30) Foreign Application Priority Data

Mar. 28, 2019 (JP) .................. 2019-063420

(51) Int. Cl.
*B62D 21/15* (2006.01)
*B62D 25/02* (2006.01)
*C21D 1/18* (2006.01)

(52) U.S. Cl.
CPC ........... *B62D 21/157* (2013.01); *B62D 25/02* (2013.01); *C21D 1/18* (2013.01)

(58) Field of Classification Search
None
See application file for complete search history.

(56) References Cited

U.S. PATENT DOCUMENTS

2010/0104891 A1* 4/2010 Nakagaito ................ C21D 9/46
148/533
2013/0269838 A1* 10/2013 Kawano ................... C21D 9/46
148/333

(Continued)

FOREIGN PATENT DOCUMENTS

EP          2 541 093 B1    11/2017
JP          2006-283174 A   10/2006

(Continued)

*Primary Examiner* — George Wyszomierski
(74) *Attorney, Agent, or Firm* — Birch, Stewart, Kolasch & Birch, LLP

(57) ABSTRACT

This frame member includes a corner section extending along the longitudinal direction; a first wall section extending from an end portion of the corner section in a direction orthogonal to the longitudinal direction; and a second wall section extending from an opposite end portion of the corner section, wherein the corner section is formed with a deformation starting portion from which a deformation starts when a load is input to the frame member in the longitudinal direction, the deformation starting portion having a shape protruding to an inner bending side or an outer bending side of the corner section, and an average hardness value $H_{(K1)}$ at a first region is equal to or greater than 330 Hv in Vickers hardness, and a 3-sigma range of a standard deviation σ in a frequency distribution of the hardness at the first region is equal to or greater than 60, the first region being located at a portion outwardly apart from an end portion of the deformation starting portion in the longitudinal direction by 10 mm in the longitudinal direction, at a depth of ¼ thickness of the frame member from a surface.

7 Claims, 7 Drawing Sheets

(56) References Cited

U.S. PATENT DOCUMENTS

2020/0024683 A1\* 1/2020 Yokoi .................... C22C 38/06
2022/0267874 A1\* 8/2022 Nakano ................. C22C 38/06

FOREIGN PATENT DOCUMENTS

| JP | 2013-43562 A | 3/2013 |
| JP | 2017-159896 A | 9/2017 |

\* cited by examiner

I-I'

FRAME MEMBER AND VEHICLE BODY STRUCTURE

TECHNICAL FIELD OF THE INVENTION

The present invention relates to a frame member and a vehicle body structure.

The present application claims priority based on Japanese Patent Application No. 2019-063420 filed in Japan on Mar. 28, 2019, and the contents thereof are incorporated herein.

BACKGROUND ART

In related art, metallic sheets are processed into members having specific cross-sectional shapes, and these members are used as frame members of a vehicle body structure for an automobile. These frame members need to achieve weight reduction and have a sufficient load resistance. In recent years, materials having high strength, such as a high-tensile steel sheet, are therefore widely employed. On the other hand, when an impact of a collision is applied to a product including the frame member, the frame member needs to be deformed in a desired deformation mode to efficiently absorb the impact.

Patent Document 1 discloses a technology for controlling a deformation mode of an impact absorption member of an automobile by partially forming, in the impact absorption member, a lower strength part as a starting point of deformation. More specifically, the impact absorption member is formed with a recessed bead having a wedge-shaped cross section from a corner section to a wall section, and this recessed bead functions as the starting point of deformation.

PRIOR ART DOCUMENT

Patent Document

[Patent Document 1] Japanese Unexamined Patent Application, First Publication No. 2013-43562

SUMMARY OF THE INVENTION

Problems to be Solved by the Invention

However, in a case where a high strength material is used for a frame member to achieve the weight reduction, it is necessary to consider an elongation property of the frame member when the frame member is being deformed. For example, when a frame member having a deformation starting portion is deformed by collision, deformation tends to occur locally at the deformation starting portion and the surrounding portion. In this case, it is difficult to realize an expected deformation mode if the high strength material of the related art is employed, and thus, it is difficult to achieve an expected energy absorption performance.

The present invention has been made in view of the problem described above, and an object of the present invention is to provide a frame member and a vehicle body structure which are novel and improved and which make it possible to improve an impact absorption performance of the frame member in a case that a high strength material is used for a frame member, by reliably controlling a bending deformation mode in which a deformation occurs from the deformation starting portion at the time of collision.

Means for Solving the Problem

To solve the above problem, the present invention employs following configurations.

(1) A first aspect of the present invention is a frame member extending in a longitudinal direction, including a corner section extending along the longitudinal direction; a first wall section extending from an end portion of the corner section in a direction orthogonal to the longitudinal direction; and a second wall section extending from an opposite end portion of the corner section, wherein the corner section is formed with a deformation starting portion from which a deformation starts when a load is input to the frame member in the longitudinal direction, the deformation starting portion having a shape protruding to an inner bending side or an outer bending side of the corner section, and an average hardness value $H_{(K1)}$ at a first region is equal to or greater than 330 Hv in Vickers hardness, and a 3-sigma range of a standard deviation σ in a frequency distribution of the hardness at the first region is equal to or greater than 60, the first region being located at a portion outwardly apart from an end portion of the deformation starting portion in the longitudinal direction by 10 mm in the longitudinal direction, at a depth of ¼ thickness of the frame member from a surface.

(2) In the frame member according to the above (1), an average hardness value $H_{(K2)}$ at a second region may satisfy $1.06 \times H_{(K2)} < H_{(K1)}$, the second region being located at a portion in a flat area of the first wall section outwardly apart from the deformation starting portion by at least 50 mm, at a depth of ¼ thickness of the frame member from a surface.

(3) In the frame member according to the above (1) or (2), the 3-sigma range of the standard deviation σ in the frequency distribution of the hardness may be equal to or less than 200.

(4) In the frame member according to any one of the above (1) to (3), a length between both ends of the deformation starting portion in the longitudinal direction may be equal to or less than 50 mm.

(5) In the frame member according to any one of the above (1) to (4), a length of the deformation starting portion in a protruding direction of a protruding shape may be equal to or less than 15 mm.

(6) In the frame member according to any one of the above (1) to (5), a tensile strength of a part forming the corner section may be equal to or greater than 1470 MPa.

(7) A second aspect of the present invention is a vehicle body structure including a frame member according to any one of the above (1) to (6), wherein the longitudinal direction of the frame member extends along with a vehicle-longitudinal direction of the vehicle body structure

Effects of the Invention

The present invention provides a frame member and a vehicle body structure which can further improve an impact absorption performance of the frame member.

EMBODIMENTS OF THE INVENTION

Figure 1:
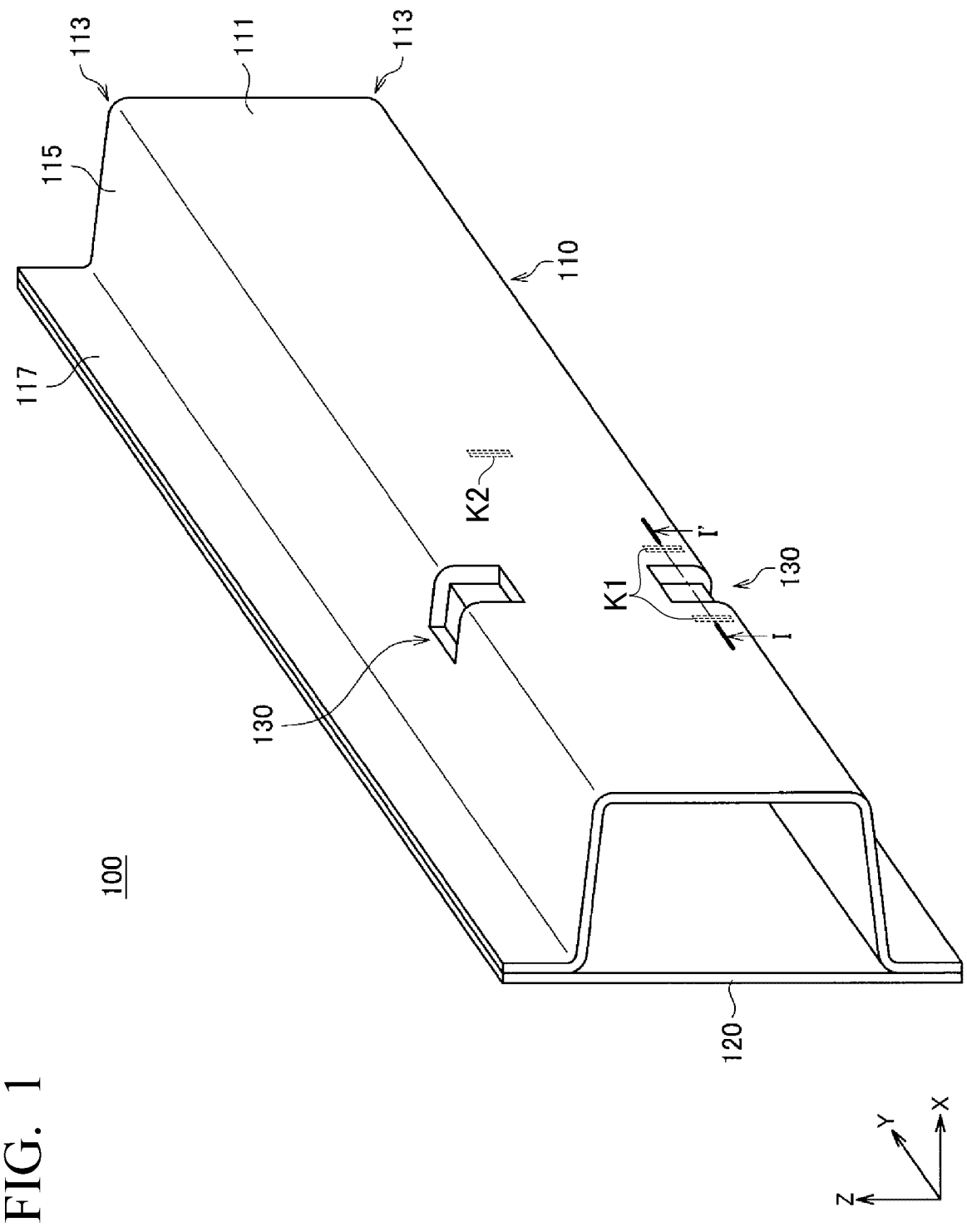
FIG. 1 is a perspective view schematically showing an appearance of a frame member according to a first embodiment of the present invention.

Preferable embodiments of the present invention will be described below in detail with reference to the accompanying drawings. In the present specification and drawings, components having substantially the same functional configuration have the same reference character and will not be redundantly described.

1. First Embodiment (Appearance of the Frame Member)

First, a frame member 100 according to a first embodiment of the present invention will be explained with reference to FIG. 1. FIG. 1 is a perspective view schematically showing an appearance of the frame member 100 according to the first embodiment. As shown in FIG. 1, the frame member 100 is a member extending in the longitudinal direction, that is, the Y direction in FIG. 1, and having a closed cross-section in a cross-sectional view (X-Z plane view). Here, the X-Z plane is a plane which has a normal direction corresponding to the longitudinal direction. The frame member 100 includes a first member 110 and a second member 120. To the frame member 100, there is a case that a load is input in the longitudinal direction of the frame member 100 (Y direction in FIG. 1).

The first member 110 is a member having a substantially hat-shape in the X-Z plane cross-sectional view. That is, the first member 110 includes a top section 111, vertical wall sections 115, and flange sections 117. The vertical wall section 115 extends from an end portion of the top section 111 in the Z direction (short-length direction) orthogonal to the longitudinal direction via a corner section 113. The flange section 117 is outwardly bent from one end of the vertical wall section 115 which is an opposite end continuing to the top section 111.

The corner section 113 extends in the longitudinal direction (Y direction in FIG. 1) of the frame member 100. From one end portion of the corner section 113 in the direction orthogonal to the longitudinal direction, the top section 111 extends as a first wall section. Further, from the other end portion of the corner section 113 in the direction orthogonal to the longitudinal direction (an end portion opposite to the end portion from which the top section 111 extends as the first wall section), a vertical wall section 115 extends as a second wall section. Further, at least part of the corner section 113 is formed with a deformation starting portion 130 which will be described below in detail.

The first member 110 can be obtained by performing a press forming process or other processes to a steel sheet so as to have a specific shape. Further, the steel material of the first member 110 may be a high strength steel having a tensile strength of equal to or greater than 1470 MPa. This first member 110 is one example of a member in which the corner section 113 is formed.

The second member 120 is a flat member so-called a closing plate. The second member 120 can be obtained by forming a steel sheet to have a flat shape with a predetermined size. Both end portions of the second member 120 in the direction (Z direction in FIG. 1) orthogonal to the longitudinal direction are joined with the flange sections 117 of the first member 110 by welding. According to this configuration, the frame member 100 is formed to have a closed cross section in X-Z plane cross-sectional view. The steel material of the second member is not particularly limited.

[Deformation Starting Portion]

Figure 2:
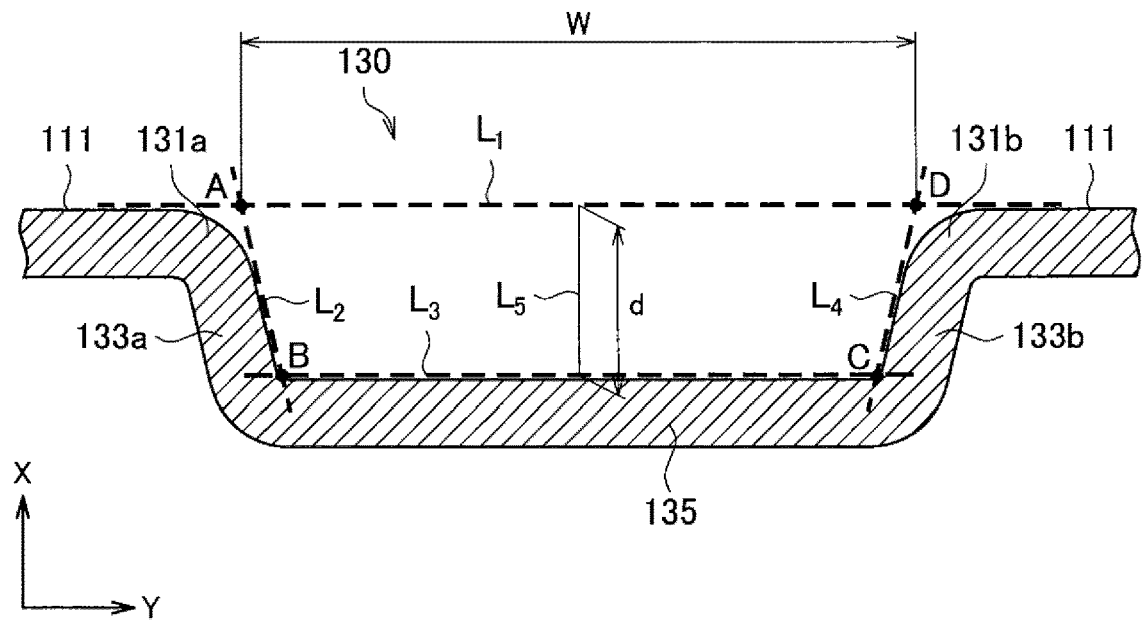
FIG. 2 is an end elevation view taken along I-I' in FIG. 1.

Hereinafter, a deformation starting portion 130 will be explained with reference to FIG. 1 and FIG. 2. FIG. 2 is an end elevation view taken along I-I' in FIG. 1 for explaining a cross-section structure of the deformation starting portion 130. As shown in FIG. 1, the deformation starting portion 130 is partially formed at a middle part of the corner section 113 in the longitudinal direction. The deformation starting portion 130 is formed along the direction orthogonal to the longitudinal direction of the corner section 113. When a load is applied to the frame member 100 in the longitudinal direction of the frame member 100, deformation of the deformation starting portion 130 occurs, and then the compressive deformation (buckling deformation) of the frame member 100 occurs in a certain deformation mode to absorb the impact. The deformation starting portion 130 has a shape protruding to the inner bending side of the corner section 113. For example, the deformation starting portion 130 is formed to have a rectangular groove shape at the corner section 113.

The deformation starting portion 130 may be simultaneously formed in a cold press forming process for making the first member 110 have a substantially hat shape. The deformation starting portion 130 may be formed in an additional cold press forming process, after a forming process of the first member 110.

As shown in FIG. 2, the deformation starting portion 130 has a pair of wall-parts 133a, 133b, and a bottom-part 135. The first wall-part 133a is bent from the top section 111 via a first corner-part 131a and is protruded toward an inner side of the closed cross section of the frame member 100. Further, the second wall-part 133b is bent from the top section 111 via a second corner-part 131b and is protruded toward an inner side of the closed cross section of the frame member 100. The bottom-part 135 is arranged to connect end portions of the wall-parts 133a and 133b in the direction extending toward the inner side of the closed cross section. The deformation starting portion 130 has a certain size including a width W and a depth d. The width W is a length between end portions of the deformation starting portion 130 along the longitudinal direction of the frame member 100. The depth d is a length in the protruding direction of a protruding shape of the deformation starting portion 130.

Here, the width W and the depth d of the deformation starting portion 130 are geometrically determined based on the respective surface position at the outer side of the closed cross section of the deformation starting portion 130 and the top section 111. Specifically, a point A is defined as an intersection point of an imaginary straight line $L_1$ and an imaginary straight line $L_2$, a point B is defined as an intersection point of an imaginary straight line $L_3$ and the imaginary straight line $L_2$, a point C is defined as an intersection point of the imaginary straight line $L_3$ and an imaginary straight line $L_4$, and a point D is defined as an intersection point of the imaginary straight line $L_1$ and the imaginary straight line $L_4$, where the imaginary straight line $L_1$ is a line drawn by extending the surface line of the top section 111 in the extending direction of the top section 111, the imaginary straight line $L_2$ is a line drawn by extending the surface line of the first wall-part 133a in the extending direction of the first wall-part 133a, the imaginary straight line $L_3$ is a line drawn by extending the surface line of the bottom-part 135 in the extending direction of the bottom-part 135, and the imaginary straight line $L_4$ is a line drawn by extending the surface line of the second wall-part 133b in the extending direction of the second wall-part 133b.

Then, the length between the point A and the point B is defined as the width W. Further, the length of a straight line $L_5$ which connects the imaginary straight line $L_1$ and the imaginary straight line $L_3$ in the protruding direction of the deformation starting portion 130 at a center position of the width W is defined as the depth d of the groove.

The intersection points can be obtained by analyzing an image of the cross section of the frame member 100 based on known image analysis methods to calculate imaginary straight lines extending from respective surface position (surface line) on the outer side of the closed cross section at the deformation starting portion 130 and the top section 111 and calculate the intersection points of the imaginary straight lines.

For example, the width W of the deformation starting portion 130 (length between one end and the other end of the deformation starting portion 130 in the longitudinal direction of the frame member 100) is set to be equal to or less than 50 mm. Further, for example, the depth d (length in the protruding direction of the protruding shape) of the deformation starting portion 130 is set to be equal to or less than 15 mm.

If the cross-sectional shape (size) of the deformation starting portion 130 was set to be relatively small as described above, the deformability of the deformation starting portion 130 was not sufficiently secured, and thus, there was a case that a crack easily occurred at the deformation starting portion 130. Further, especially, if the deformation starting portion 130 was formed by a high strength material such as a high strength steel sheet, the crack was more likely to occur at the deformation starting portion 130. However, in the deformation starting portion 130 of the frame member 100 according to the first embodiment, a portion in the vicinity of the deformation starting portion 130 has a proper distribution of the hardness as described below. Thus, even if the size of the deformation starting portion 130 is set in the above-mentioned range, it is possible to suppress the occurrence of the crack.

The lower limit of the width W of the deformation starting portion 130 is not particularly limited, but the width W is preferably equal to or greater than 1 mm. More preferably, the width W of the deformation starting portion 130 is equal to or greater than 20 mm, and is equal to or less than 30 mm. In this case, it is possible to reliably perform a function of initiating the deformation at the time of collision. Further, the lower limit of the depth d of the deformation starting portion 130 is not particularly limited, but the depth d is preferably equal to or greater than 1 mm. The depth d of the deformation starting portion 130 is more preferably equal to or greater than 2 mm, and more preferably, equal to or greater than 3 mm. In this case, it is possible to reliably perform the function of initiating the deformation at the time of collision.

Further, if the cross-sectional shape of the deformation starting portion 130 is set in the range as mentioned above, the stiffness of the deformation starting portion 130 increases, whereby the load resistance of the frame member 100 improves. As a result, it is possible to improve the impact absorption performance of the frame member 100.

[Hardness of a Portion in the Vicinity of the Deformation Starting Portion]

The hardness of the deformation starting portion 130 of the frame member 100 according to the first embodiment will subsequently be described with reference to FIG. 3 to FIG. 6.

Figure 3:
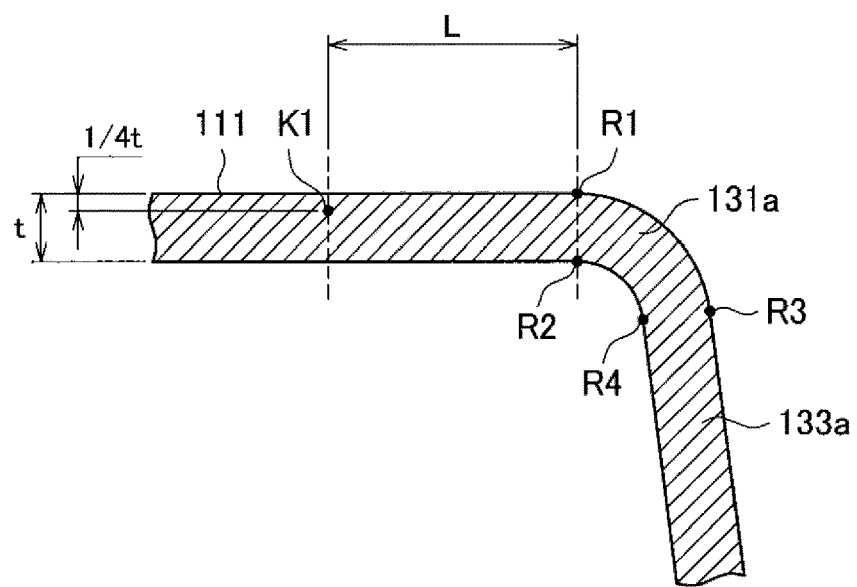
FIG. 3 is an enlarged view showing a portion in the vicinity of a first corner-part of the frame member according to the first embodiment.

FIG. 3 is an enlarged view of a portion in the vicinity of the deformation starting portion 130 of the frame member 100 according to the first embodiment.

Figure 4:
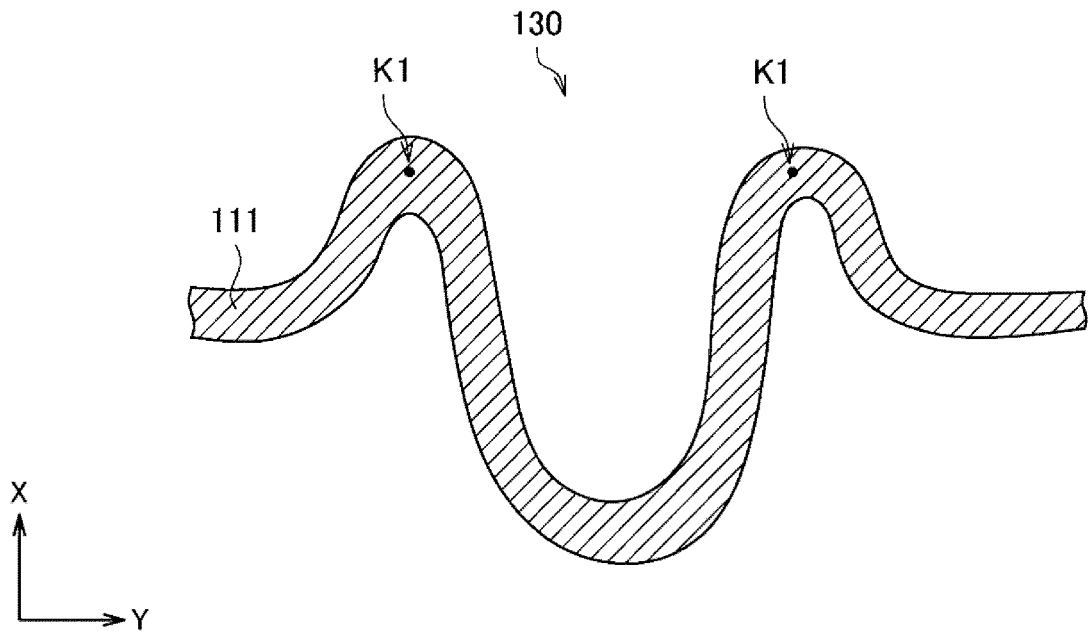
FIG. 4 is a view schematically showing a deforming manner of a deformation starting portion of the frame member according to the first embodiment.

FIG. 4 is a view schematically showing a deformation manner of the deformation starting portion 130 of the frame member 100 according to the first embodiment.

Figure 5:
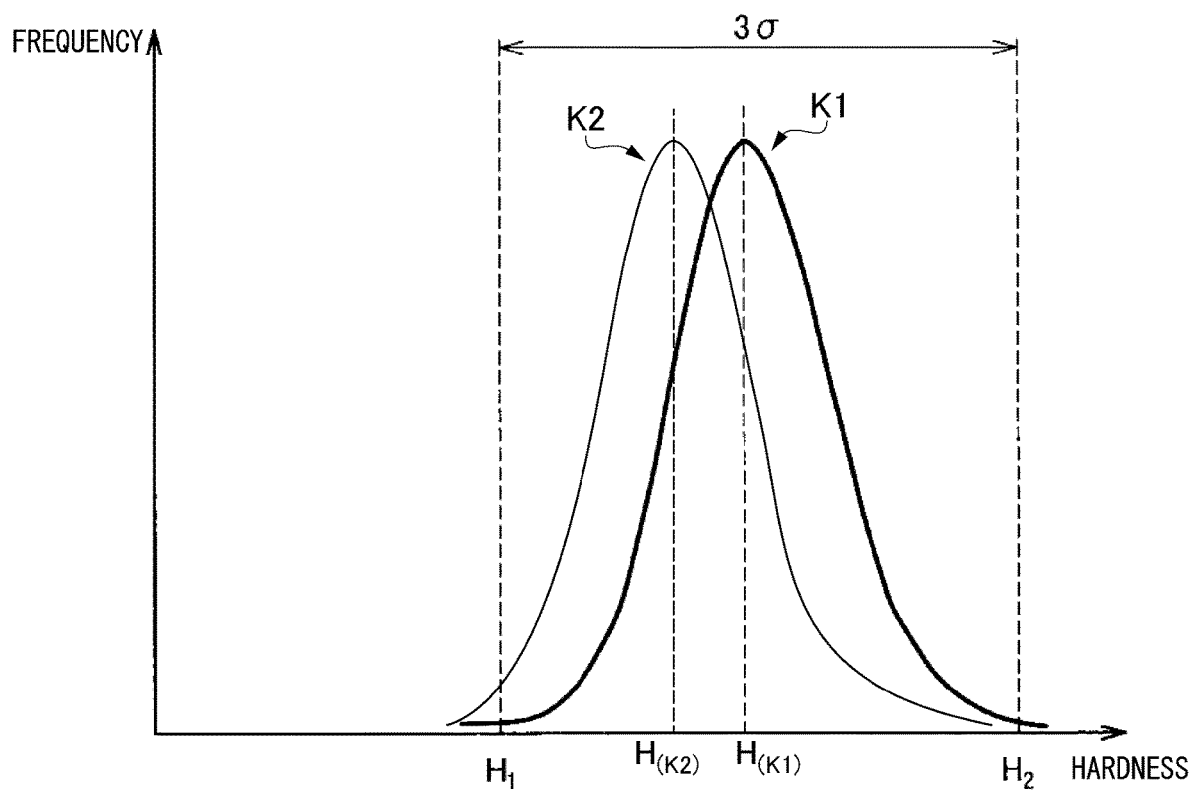
FIG. 5 shows examples of frequency distributions of the hardness obtained at specific regions of the frame member according to the first embodiment.

FIG. 5 illustrates examples of frequency distributions of the hardness obtained at the first region K1 and the second region K2. The first region K1 is located at a portion outwardly apart from an end portion of the deformation starting portion 130 in the longitudinal direction of the frame member 100 according to the first embodiment by 10 mm in the longitudinal direction, at a depth of ¼ thickness of the frame member 100 from the surface. The second region K2 is located at a portion in a flat area outwardly apart from the deformation starting portion 130 by at least 50 mm, at a depth of ¼ thickness of the frame member 100 from the surface.

Figure 6:
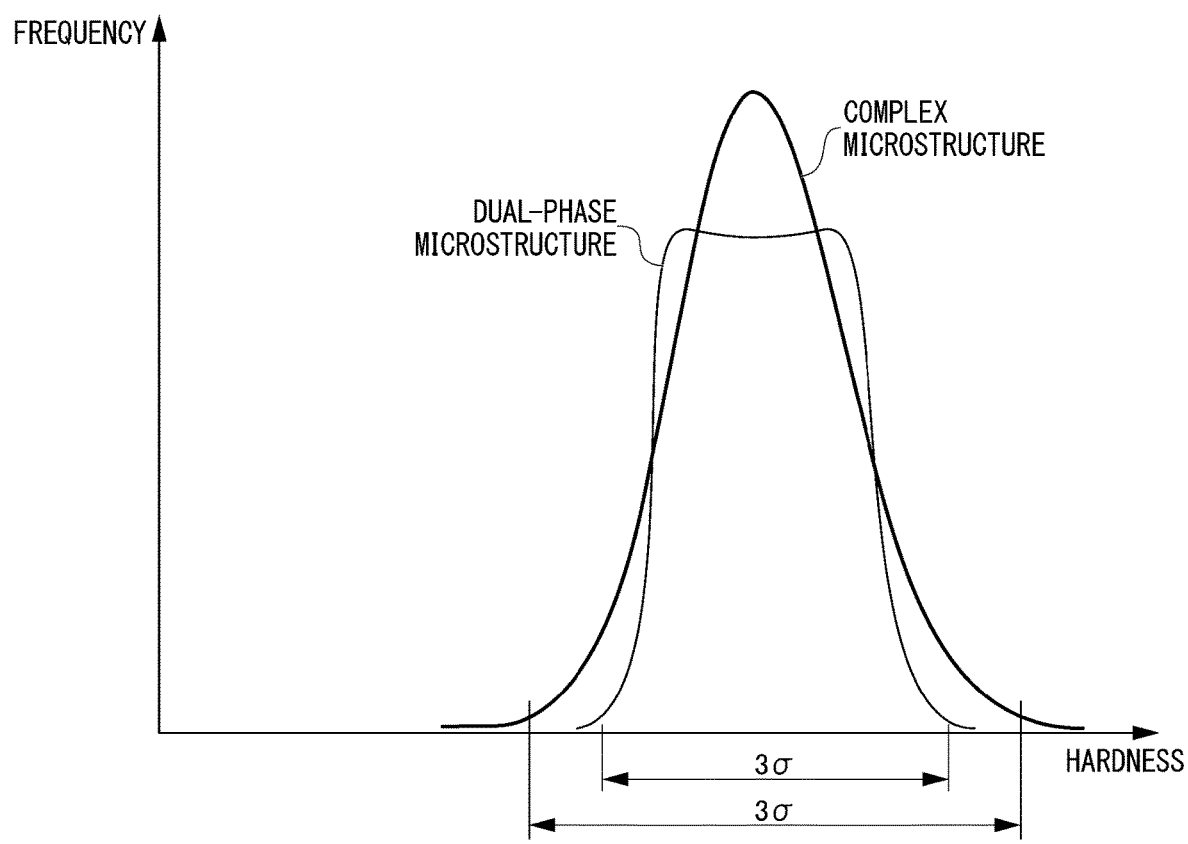
FIG. 6 is a graph schematically showing hardness distributions of a dual phase microstructure and a complex microstructure.

FIG. 6 illustrates examples of frequency distributions of the hardness of the steel sheet having a ferrite-martensite dual phase microstructure, and the hardness of the steel sheet having a complex microstructure in which fresh martensite, tempered martensite, ferrite, bainite, and residual austenite are finely dispersed.

As described above, the first corner-part 131a is provided between the top section 111 and the first wall-part 133a of the deformation starting portion 130. Specifically, as shown in FIG. 3, the first corner-part 131a is formed between the R-end points R1, R2 which are adjacent to the top section 111 and the R-end points R3, R4 which are adjacent to the first wall-part 133a.

The present inventors diligently studied the deformation of the deformation starting portion 130 and discovered that the deformation occurred at a particular portion outwardly apart from the deformation starting portion 130 gives a significant influence on the behavior of the deformation starting portion 130. That is, if the load is applied in the longitudinal direction (direction Y in FIG. 1) of the frame member 100, deformation occurs at the deformation starting portion 130 and the surrounding portion. Specifically, as shown in FIG. 4, the deformation of the deformation starting portion 130 occurs in a manner that the end portions of the deformation starting portion 130 in the longitudinal direction of the frame member 100 approach each other. In this deformation, especially at the later deformation phase during the deformation of the deformation starting portion 130, a large out-of-plane deformation occurs at a portion in the vicinity of the deformation starting portion 130, thus, the internal stress increases in the first region K1. As a result, there is a case that a crack tends to occur at the deformation starting portion 130 or the surrounding portion of the frame member 100.

Especially, in a case that the deformation starting portion 130 is formed by a high strength material, a fracture tends to occur when the deformation starting portion 130 is deformed. As a result, deformation of the deformation starting portion 130 occurs in an unexpected deformation mode. Thus, an expected energy absorption amount may not be fully secured.

The first region K1 is located at a portion in the vicinity of the deformation starting portion 130 and is a region to which a large stress is applied. This first region K1 is defined at a portion outwardly apart from the end portion of the deformation starting portion 130 by a length of 10 mm in the longitudinal direction of the frame member 100. More specifically, as shown in FIG. 3, the first region K1 is located at a portion outwardly apart from the deformation starting portion 130 by a distance L=10 mm in the longitudinal direction of the frame member 100, from the R-end points R1, R2 of the first corner-part 131a which continue to the top section 111. Further, the first region K1 is located at a depth of ¼ of the sheet thickness t of the frame member 100 in the sheet thickness direction from a surface, which continues to the outer bending side surface of the first corner-part 131a (that is, an outer surface of the closed cross section of the frame member 100).

Further, regarding the first region K1 as specified above, the present inventors conceived of a technical concept of controlling the distribution of hardness obtained at the first region K1 to suppress the occurrence of the crack at the deformation starting portion 130. The hardness of a portion in the vicinity of the deformation starting portion 130 of the frame member 100 according to the first embodiment will be explained below.

Regarding the hardness obtained at a portion in the vicinity of the deformation starting portion 130 of the frame member 100 according to the first embodiment, the present inventors discovered that it is effective if the frequency distribution of the Vickers hardness obtained at the first region K1 satisfies certain conditions. Specifically, as shown in FIG. 5, in the frequency distribution of the hardness obtained at the first region K1, the average hardness value $H_{(K1)}$ is controlled to be equal to or greater than 330 Hv in Vickers hardness and 3-sigma range of the standard deviation $\sigma$ in terms of the Vickers hardness is controlled to be equal to or greater than 60 ($3\sigma \geq 60$). This frequency distribution of the hardness may be realized, for example, by refining the prior austenite grains in a complex microstructure including ferrite, bainite, fresh martensite, tempered martensite, and residual austenite, and then adjusting a precipitation order of the respective microstructure, such that ferrite, bainite, fresh martensite, tempered martensite, and residual austenite are finely dispersed at a various ratio in an area of an indentation of the Vickers hardness measuring test.

As shown in FIG. 6, the frequency distribution of the hardness of the steel sheet having a ferrite-martensite dual phase structure exhibits a narrow 3-sigma range ($3\sigma$). On the other hand, the frequency distribution of the hardness of the steel sheet having a complex structure in which fresh martensite, tempered martensite, ferrite, bainite, and a residual austenite are finely dispersed exhibits a broad 3-sigma range, because each microstructure has a different hardness. Therefore, by suitably controlling the microstructure of the first region K1, it is possible to realize 3-sigma range of equal to or greater than 60 ($3\delta \geq 60$).

Further, the microstructure may be locally controlled by employing a mechanism of a "processing induced transformation hardening" in the deformation starting portion 130. In this case, if an average hardness obtained at the second region K2 of the top section 111 shown in FIG. 1 is defined as $H_{(K2)}$, the value of $H_{(K1)}$ becomes larger than the value of $H_{(K2)}$ as shown in FIG. 5, and a relationship of $H_{(K2)} \times 1.06 < H_{(K1)}$ can be satisfied. Here, the second region K2 may be located at a portion in a flat area of the top section 111 outwardly apart from the deformation starting portion 130 by at least 50 mm, at a depth of ¼ thickness of the frame member from the surface.

If the distribution of the hardness satisfies the above relationship of $H_{(K2)} \times 1.06 < H_{(K1)}$, it is possible to locally suppress the occurrence of the crack at the deformation starting portion 130 or a portion in the vicinity of the deformation starting portion 130 where the internal stress becomes high. In addition, with a reasonable design, the deformation mode can be reliably controlled to be the bending deformation mode in which the deformation starting portion 130 is initially deformed at the time of collision. Accordingly, it is possible to further improve the impact absorption performance of the frame member.

Further, if an average hardness value obtained at a third region K3 is defined as $H_{(K3)}$, a relationship of $H_{(K3)} \times 1.06 < H_{(K1)}$ may be satisfied. Though it is not shown in the drawings, the third region is located at a portion in a flat area of the vertical wall section 115 outwardly apart from the deformation starting portion 130 by at least 50 mm at a depth of ¼ thickness of the frame member from the surface. It is preferable to satisfy this relationship because it is possible to locally suppress the occurrence of the crack at the deformation starting portion 130 or a portion in the vicinity of the deformation starting portion 130 where the internal stress becomes high. In addition, with a reasonable design, the deformation mode can be reliably controlled to be the bending deformation mode in which the deformation starting portion 130 is initially deformed at the time of collision. Accordingly, it is possible to further improve the impact absorption performance of the frame member.

In the frequency distribution of the hardness obtained at the first region K1, if the average hardness value $H_{(K1)}$ in Vickers hardness is equal to or greater than 330 Hv, the strength of a whole of the frame member 100 including a portion in the vicinity of the deformation starting portion 130 can be fully secured, thus, the load resistance improves. As a result, the impact absorption performance of the frame member 100 further improves.

Further, if 3-sigma range of the standard deviation $\sigma$ in the frequency distribution of the Vickers hardness obtained at the first region K1 is equal to or greater than 60 ($3\sigma \geq 60$), the distribution of the hardness at a portion in the vicinity of the deformation starting portion 130 has a certain range. That is, a portion in the vicinity of the deformation starting portion 130 of the frame member 100 has a broad hardness range including a relatively low value and a relatively high value. As a result, when a load is applied to the frame member 100 to generate a deformation, which occurs from the deformation starting portion 130, at an area including a portion in the vicinity of the deformation starting portion 130, the generation of the strain caused by this deformation continuously occurs in accordance with an internal stress of the frame member 100. That is, yielding phenomenon occurs continuously when the deformation occurs at a portion in the vicinity of the deformation starting portion 130, whereby the deformability of the frame member 100 further improves.

Here, the frequency distribution of the hardness of the frame member 100 according to the first embodiment can be obtained by performing Vickers hardness test.

First, a test sample is cut out from a part including a measuring portion. The size of the test sample may be 10 mm×10 mm, depending on the measuring device.

In the test sample thus obtained, mechanical grinding process is performed to a surface by a depth of ¼ sheet thickness.

Then, to the test sample to which the measurement surface has been prepared based on JIS Z 2244: 2009, measurements are performed by using a micro-Vickers hardness tester in accordance with a method described in JIS Z 2244: 2009.

More specifically, measurements are performed by applying a load of 0.98 N at 500 measurement points with an interval of equal to or greater than three times the diameter of the indentation.

Further, in the frequency distribution of the hardness of the frame member 100 according to this embodiment obtained by the above explained Vickers hardness test, a known statistical method can be used to obtain values such as an average hardness value $H_{(K1)}$ and a standard deviation σ.

Further, 1-sigma range of the standard deviation σ in the frequency distribution of the hardness obtained at the first region K1 may be equal to or less than 20 (1σ≤20). In this case, in the frequency distribution of the hardness obtained at the first region K1, the dispersion of the hardness is controlled within a certain range so that the occurrence of the crack due to the drastic change in the hardness can be suppressed.

Further, 3-sigma range of the standard deviation σ in the frequency distribution of the Vickers hardness obtained at the first region K1 may be equal to or less than 200 (3σ≤200). In this case, in the frequency distribution of the hardness obtained at the first region K1, the dispersion of the hardness is controlled within a certain range so that the occurrence of the crack due to the drastic change in the hardness can be suppressed.

According to the first embodiment, in the frame member 100 including the deformation starting portion 130, the hardness obtained at the first region K1 which is located at a portion in the vicinity of the deformation starting portion 130 has a certain distribution. That is, the 3-sigma range of the standard deviation G in a frequency distribution of the hardness obtained at the first region K1 is equal to or greater than 60 (3σ≥60). Further, in the frequency distribution of the hardness, the average hardness value $H_{(K1)}$ is equal to or greater than 330 Hv. Thus, the distribution of the hardness of the frame member 100 has a certain range from a relatively lower value to a relatively higher value of the hardness, with an average value at the center of the range. As a result, when a deformation occurs from the deformation starting portion 130, the frame member 100 exhibits a sufficient load resistance and suppresses the occurrence of the crack due to the hardness change and locally concentrated strain, whereby the energy absorption amount of the frame member 100 increases. Accordingly, it is possible to further improve the impact absorption performance of the frame member 100.

Further, according to the first embodiment, the deformation starting portion 130 has a shape protruding to the inner bending side of the corner section 113, which is a structurally lower strength part, and the hardness obtained at the first region K1 located at a portion in the vicinity of the deformation starting portion 130 is controlled to have a certain distribution. With this configuration, when compared to a case in which the deformation starting portion 130 is simply softened to reduce the strength, the buckling deformation does not occur by a small load of the axial crushing, and thus the deformation starting portion 130 is deformed in a desired deformation mode. As a result, the frame member 100 according to the first embodiment can sufficiently secure an energy absorption amount.

In the first embodiment, the first region K1 where the hardness distribution is obtained is located at a portion outwardly apart from the first corner-part 131a of the deformation starting portion 130 by a distance L=10 mm in the longitudinal direction of the frame member 100. However, the present invention is not limited to this example.

For example, the first region K1 where the hardness distribution is obtained may be located at a portion outwardly apart from the second corner-part 131b of the deformation starting portion 130 by a distance L=10 mm in the longitudinal direction of the frame member 100.

Further, two of the first regions K1 may be set. In this case, each first region K1 is located at a portion outwardly apart from each of the first corner-part 131a and the second corner-part 131b of the deformation starting portion 130 by a distance L=10 mm in the longitudinal direction of the frame member 100.

2. Second Embodiment

Figure 7:
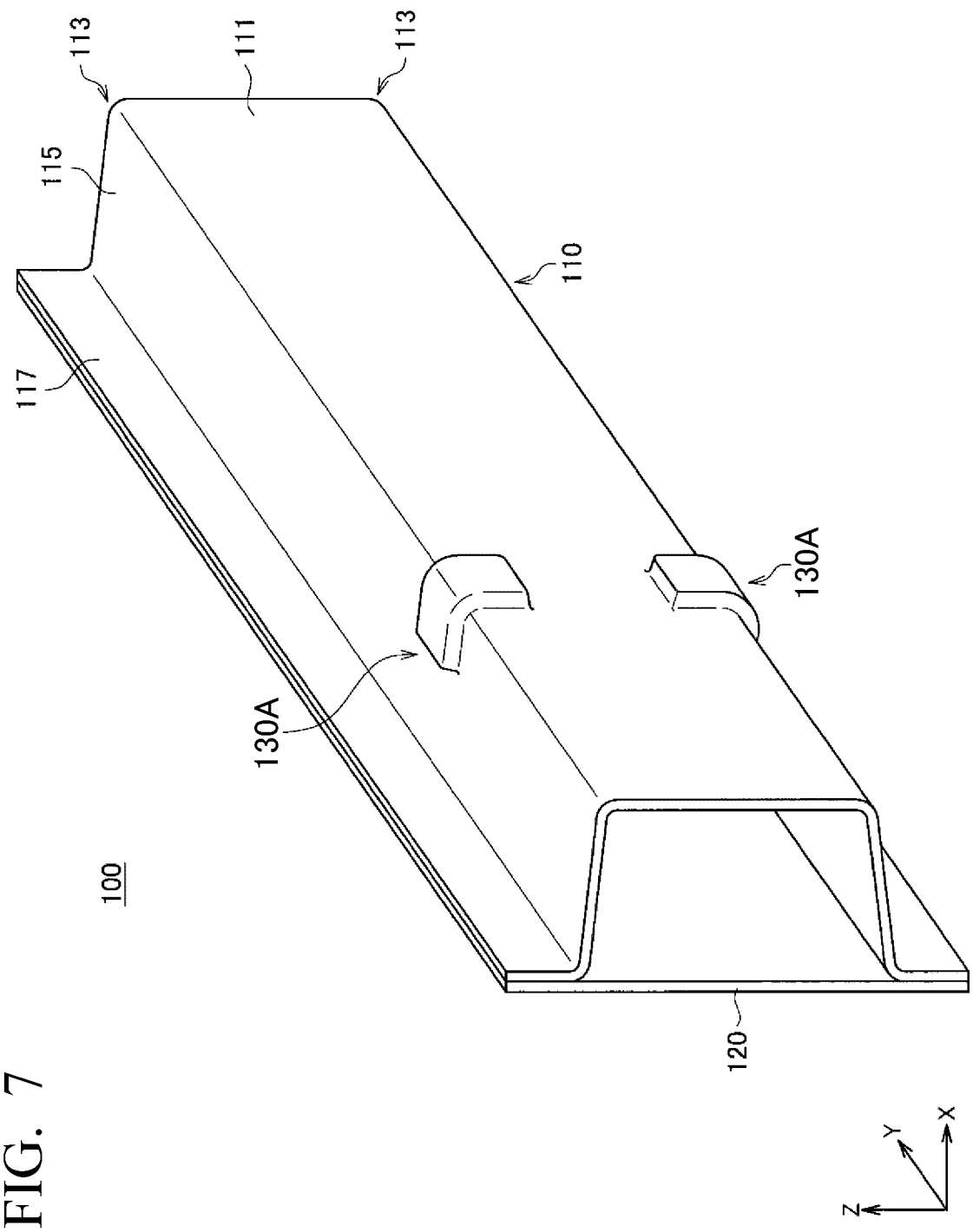
FIG. 7 is a perspective view schematically showing an appearance of a frame member according to a second embodiment of the present invention.

Hereinafter, a frame member 100 according to the second embodiment of the present invention will be explained with reference to FIG. 7. FIG. 7 is a perspective view showing an appearance of the frame member 100 according to the second embodiment. The frame member 100 according to the second embodiment differs from the first embodiment in a point that the deformation starting portion 130A is provided so as to protrude to the outer bending side of the corner section 113. In the explanation of the second embodiment, some of mutual configurations which have already been explained in the first embodiment will be omitted.

As shown in FIG. 7, the deformation starting portion 130A is partially formed at a middle part of the corner section 113 in the longitudinal direction. The deformation starting portion 130A is formed along the direction orthogonal to the longitudinal direction of the corner section 113. The deformation starting portion 130A has a shape protruding to the outer bending side of the corner section 113.

In the deformation starting portion 130A of the frame member 100 according to the second embodiment, as same as the first embodiment, the hardness obtained at the first region K1, which is located at a portion in the vicinity of the deformation starting portion K1, has a certain distribution. More specifically, the first region K1 is set at a portion outwardly apart from R-end points of the corner section in the longitudinal direction of the frame member 100 (Y direction in FIG. 7) by a distance L=10 mm, at a depth of ¼ thickness of the frame member 100 in the sheet thickness direction. The depth in the sheet thickness direction is a depth from the surface continuing to an outer bending side surface of the corner section (surface of the closed cross section of the frame member 100).

Further, regarding the hardness obtained at a portion in the vicinity of the deformation starting portion 130A of the frame member 100 according to the second embodiment, the hardness obtained at the first region K1 is controlled to have a certain frequency distribution of the hardness. More specifically, in the frequency distribution of the hardness, an average hardness value $H_{(K1)}$ is controlled to be equal to or greater than 330 Hv. Further, 3-sigma range of the standard deviation σ in the frequency distribution of the hardness is equal to or greater than 60 (3σ≥60).

According to the second embodiment, even if the deformation starting portion 130A has a shape protruding to the outer bending side of the corner section 113, the frequency distribution of the hardness is suitably controlled at the first region K1 located at a portion in the vicinity of the deformation starting portion 130A. As a result, when the deformation occurs from the deformation starting portion 130A, the frame member 100 exhibits a sufficient load resistance, and the crack caused due to the difference in hardness or the local concentration of stress can be suppressed, whereby the expected deformation mode can be realized. Therefore, the energy absorption amount of the frame member 100 increases. Accordingly, the impact absorption performance of the frame member 100 further improves.

3. Third Embodiment

Figure 8:
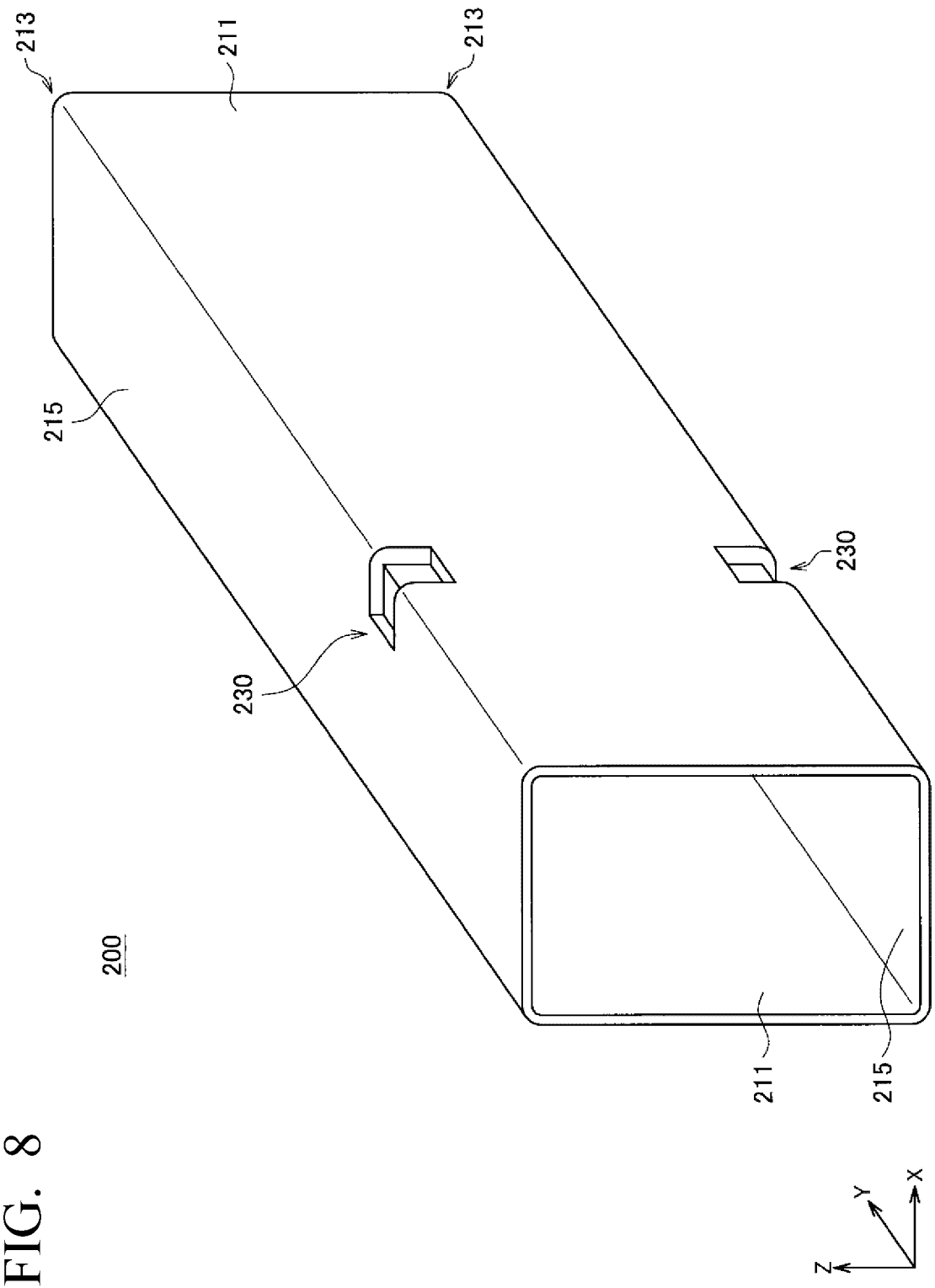
FIG. 8 is a perspective view schematically showing an appearance of a frame member according to a third embodiment of the present invention.

A frame member 200 according to the third embodiment of the present invention will subsequently be described with reference to FIG. 8. FIG. 8 is a perspective view schematically showing an appearance of the frame member 200 according to the third embodiment. The frame member 200 according to the third embodiment has a rectangular tubular shape and is different from the first embodiment in this point. In the explanation of the third embodiment, some of mutual configurations which have already been explained in the above embodiments will be omitted.

As shown in FIG. 8, for example, the frame member 200 extends in the Y direction, which corresponds to the longitudinal direction. FIG. 8 shows that the frame member 200 is a member having a hollow rectangular shape and has a closed cross section in the X-Z plane cross section in which the normal direction corresponds to the longitudinal direction of the frame member 200. The frame member 200 includes a pair of first wall sections 211, corner sections 213 provided on end portions of the first wall section 211 in the direction orthogonal to the longitudinal direction (Z direction in FIG. 8), and a pair of second wall sections 215 provided in the direction perpendicular to the first wall section 211 from each of the corner sections 213.

The deformation starting portion 230 is partially formed at a middle part of the corner section 213 in the longitudinal direction. The deformation starting portion 230 is formed along the direction orthogonal to the longitudinal direction of the corner section 213. The deformation starting portion 230 has a shape protruding to the inner bending side of the corner section 213. In other words, the deformation starting portion 230 is provided in a shape of a groove in the corner section 213.

At the first region K1 which is located at a portion in the vicinity of the deformation starting portion 230, the frequency distribution of the hardness is controlled to have a certain distribution. Specifically, in the frequency distribution of the hardness, the average hardness value $H_{(K1)}$ is controlled to be equal to or greater than 330 Hv. Further, 3-sigma range of the standard deviation σ in this frequency distribution of the hardness is equal to or greater than 60 (3σ≥60).

According to this third embodiment, even if the frame member 200 has a rectangular tubular shape, when the deformation occurs from the deformation starting portion 230A, the frame member 200 exhibits a sufficient load resistance, and the crack caused due to the difference in hardness or the local concentration of stress can be suppressed, whereby the expected deformation mode can be realized. Therefore, the energy absorption amount of the frame member 200 increases. Accordingly, the impact absorption performance of the frame member 200 further improves.

[Applicable Examples of the Frame Member According to the Embodiments of the Present Invention]

Figure 9:
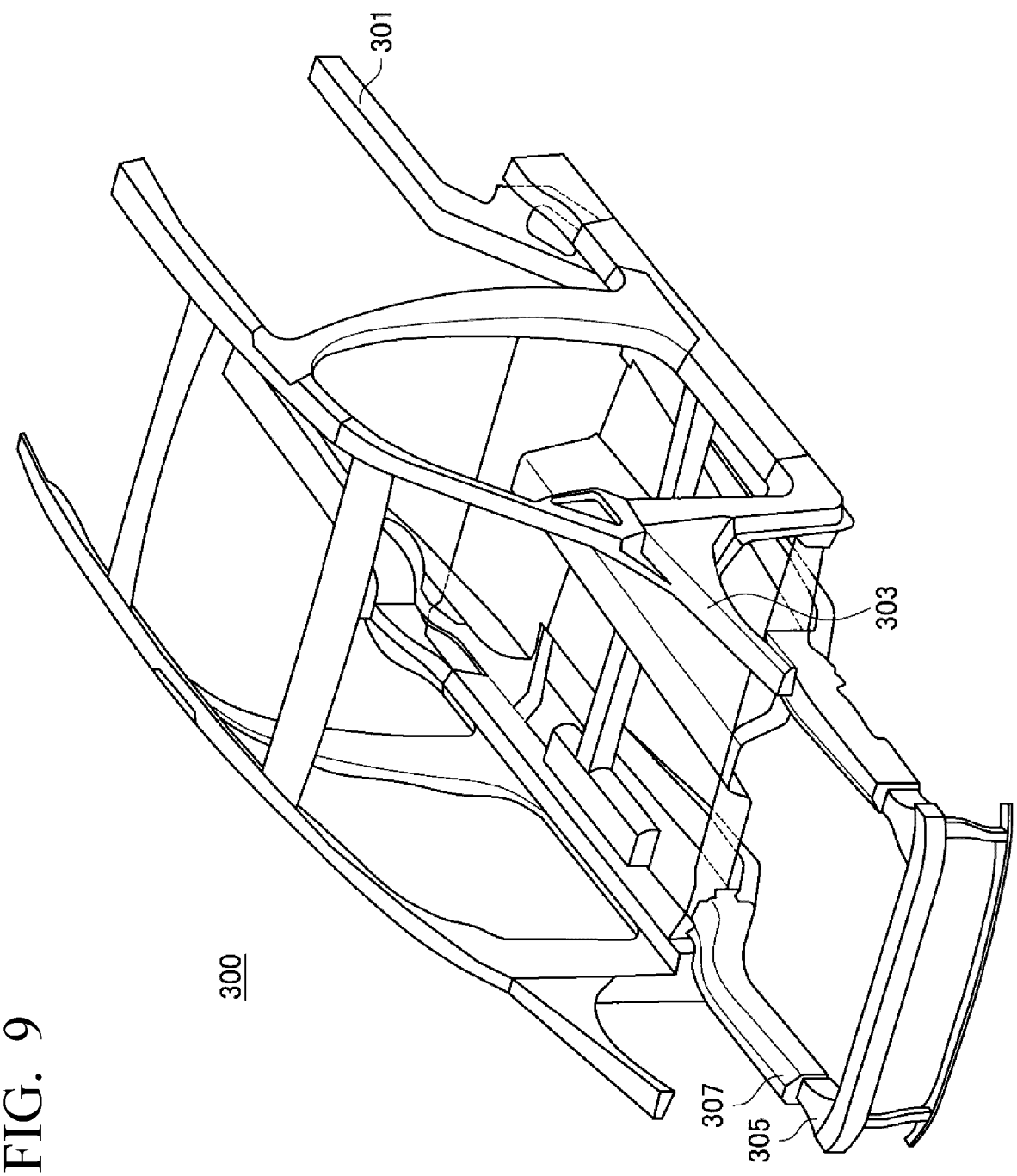
FIG. 9 shows an example of a vehicle body structure to which the frame member according to an embodiment of the present invention is applied.

Preferable embodiments of the present invention have been explained in detail. Applicable examples of the frame member according to the embodiments of the present invention will be further explained with reference to FIG. 9. FIG. 9 shows an example of a vehicle body structure 300 to which the frame members 100 and 200 according to the embodiments of the present invention are applied. The frame member 100 or 200 may be used as part of the vehicle body structure 300, to expect a function of an impact absorption frame. The frame member 100 or 200 is arranged such that the longitudinal direction thereof corresponds to the vehicle-longitudinal direction (front-rear direction) of the vehicle body structure 300. Further, in the vehicle body structure 300, the frame member 100 or 200 may be used as an impact absorption frame. Specifically, a rear side member 301, an apron upper member 303, a crush box 305, and a front side member 307 are examples of the impact absorption frame to which the frame member 100 or 200 is applied.

Example

To evaluate the properties of the frame member according to the present invention, frame members having a shape as shown in FIG. 1 were formed to perform axial compression tests.

In the Comparative Example 1, the hardness obtained at the first region K1 which is located at a portion in the vicinity of the deformation starting portion, 3-sigma range of the standard deviation σ in the frequency distribution of the hardness was 40 (3σ=40). Similarly in the Example 1, 3-sigma range of the standard deviation σ in the frequency distribution of the hardness was 76 (3σ=76). Further, similarly in the Example 2, 3-sigma range of the standard deviation σ in the frequency distribution of the hardness was 151 (3σ=151). In these Comparative Example and the Examples, the average value in the frequency distribution was equal to or greater than 330 Hv.

The first region K1 was set at a portion outwardly apart from R-end points R1 and R2 of the first corner-part 131a by a distance L=10 mm, at a depth of ¼ thickness of the frame member 100 in the sheet thickness direction.

Inputting the load by pressing an impactor by 50 mm from the longitudinal direction of the frame member (Y direction in FIG. 1), the deformation mode and the existence of the crack at the deformation starting portion of the frame member were evaluated. Table 1 shows the results.

TABLE 1

| | 3-sigma range in the frequency distribution of the hardness (3σ) | Strain at the deformation starting portion after collision (γ) | Existence of crack at the deformation starting portion |
|---|---|---|---|
| Comparative Example 1 | 40 | 0.6 | Exist |
| Example 1 | 76 | 0.4 | Not Exist |
| Example 2 | 151 | 0.38 | Not Exist |

As shown in Table 1, in the Comparative Example 1, 3-sigma range of the standard deviation σ in the frequency distribution of the hardness was smaller than 60. Thus, a lot of strains were generated in the deformation starting portion, whereby the crack occurred at the deformation starting portion. On the other hand, in the Example 1, 3-sigma range was 76 (3σ=76), and a relationship of 3σ≥60 was satisfied; thus, the generation of the strain was suppressed at the deformation starting portion, and the crack did not occur at the deformation starting portion. The same applies to the Example 2 in which 3-sigma range was 151 (3σ=151); the generation of the strain in the deformation starting portion was suppressed, and the crack did not occur. As shown above, if the first region K1, which is located at a portion in the vicinity of the deformation starting portion 130, has a proper frequency distribution of the hardness, it is possible to suppress the occurrence of the crack at the deformation starting portion 130.

Preferable embodiments of the present invention have been described above with reference to the accompanying drawings, but the present invention is not limited thereto. It is apparent that a person who has typical knowledge in the technical field to which the present invention belongs can realize a variety of changes or modifications within the technical idea category set in the present application, and it is understood that the changes or modifications also naturally belong to the technical scope of the present invention.

For example, in the above embodiments, the deformation starting portion 130, 130A, 230 is provided at the corner section 113, 213, but the present invention is not limited to these examples. For example, the deformation starting portion 130, 130A, 230 may be provided so as to extend from the corner section 113, 213 to the top section 111, 211, which corresponds to a first wall section. Further, the deformation starting portion 130, 130A, 230 may be provided so as to extend from the corner section 113, 213 to the vertical wall section 115, 215, which corresponds to a second wall section.

Further, in the above embodiments, the deformation starting portion 130, 130A, 230 is provided at one place in the corner section 113, 213. However, the present invention is not limited thereto. For example, two or more deformation starting portions 130, 130A, 230 may be partially provided at middle parts of the corner section 113, 213 in the longitudinal direction of the frame member 100, 200.

Further, in the above embodiments, the deformation starting portion 130, 130A, 230 has a structure of a rectangular cross section when viewed from the longitudinal direction of the frame member 100, 200, but the present invention is not limited to these examples. For example, the deformation starting portion 130, 130A, 230 may have an arc type cross section and a wedge type (V-type) cross section when viewed from the longitudinal direction of the frame member 100, 200. When these shapes are employed, the length (depth) d, which is a length in the protruding direction of the protruding shape of the deformation starting portion 130, 130A, 230, is a length from a surface of the frame member 100, 200 to the furthest portion from the surface in the protruding direction.

INDUSTRIAL APPLICABILITY

According to the present invention, it is possible to provide a frame member and a vehicle body structure which can improve the impact absorption performance of the frame member.

BRIEF DESCRIPTION OF THE REFERENCE SYMBOLS 100, 200 Frame member
110 First member
111, 211 Top section (First wall section)
113, 213 Corner section
115, 215 Vertical wall section (Second wall section)
117 Flange section
120 Second member
130, 130A, 230 Deformation starting portion
300 Vehicle body structure

What is claimed is:

1. A frame member extending in a longitudinal direction, comprising:
   a corner section extending along the longitudinal direction;
   a first wall section extending from an end portion of the corner section in a direction orthogonal to the longitudinal direction; and
   a second wall section extending from an opposite end portion of the corner section, wherein
   the corner section is formed with a deformation starting portion from which a deformation starts when a load is input to the frame member in the longitudinal direction, the deformation starting portion having a shape protruding to an inner bending side or an outer bending side of the corner section, and
   an average hardness value $H_{(K1)}$ at a first region is equal to or greater than 330 Hv in Vickers hardness, and a 3-sigma range of a standard deviation σ in a frequency distribution of hardness at the first region is equal to or greater than 60, the first region including a plurality of points located along the direction of the first wall section and outwardly apart from an end portion of the deformation starting portion in the longitudinal direction by 10 mm, at a depth of ¼ thickness of the frame member from a surface of the first wall section.

2. The frame member according to claim 1, wherein an average hardness value $H_{(K2)}$ at a second region satisfies $1.06 \times H_{(K2)} < H_{(K1)}$, the second region including a plurality of points located along the direction of the first wall section in a flat area of the first wall section outwardly apart from the deformation starting portion by at least 50 mm, at a depth of ¼ thickness of the frame member from a surface of the first wall section.

3. The frame member according to claim 1, wherein the 3-sigma range of the standard deviation σ in the frequency distribution of the hardness is equal to or less than 200.

4. The frame member according to claim 1, wherein a length between both ends of the deformation starting portion in the longitudinal direction is equal to or less than 50 mm.

5. The frame member according to claim 1, wherein a length of the deformation starting portion in a protruding direction of the shape that is protruding is equal to or less than 15 mm.

6. The frame member according to claim 1, wherein a tensile strength of a part forming the corner section is equal to or greater than 1470 MPa.

7. A vehicle body structure comprising a frame member according to claim 1,
   wherein the longitudinal direction of the frame member extends along with a vehicle-longitudinal direction of the vehicle body structure.

* * * * *